Aug. 7, 1934.    M. GARL    1,968,824
SIGNAL APPARATUS
Filed May 27, 1930    3 Sheets-Sheet 1
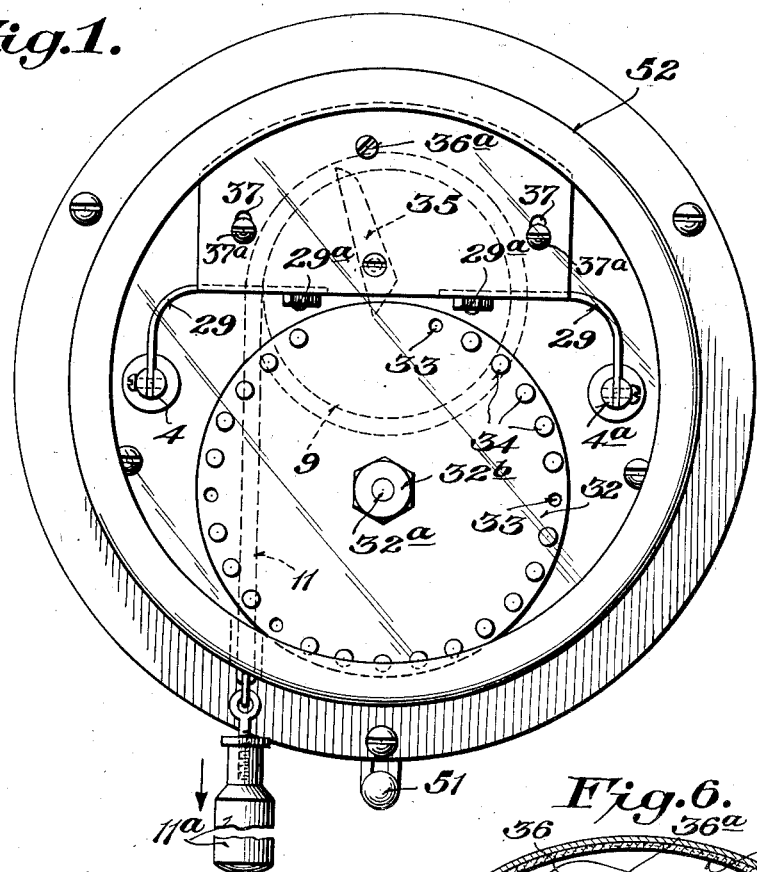
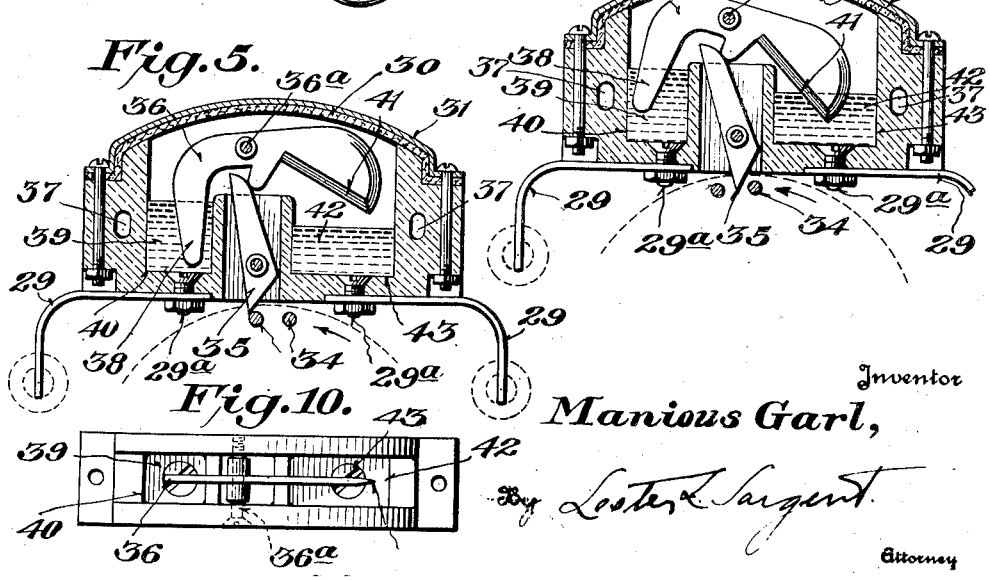
Inventor
Manious Garl,
By Lester L. Sargent
Attorney Aug. 7, 1934.    M. GARL    1,968,824
SIGNAL APPARATUS
Filed May 27, 1930    3 Sheets-Sheet 2
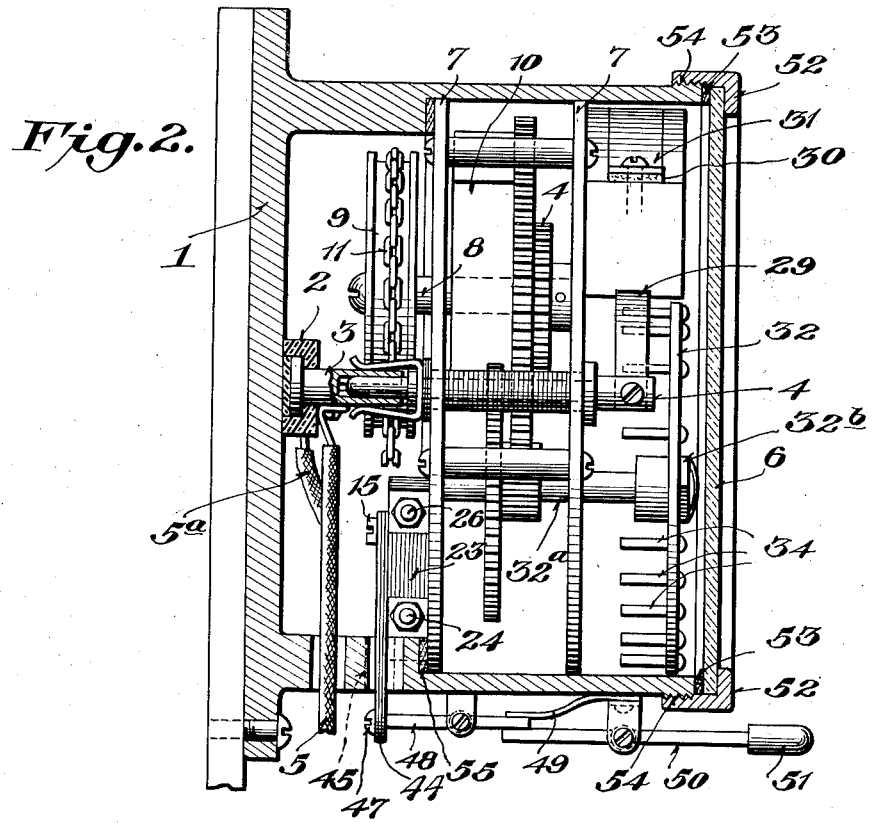
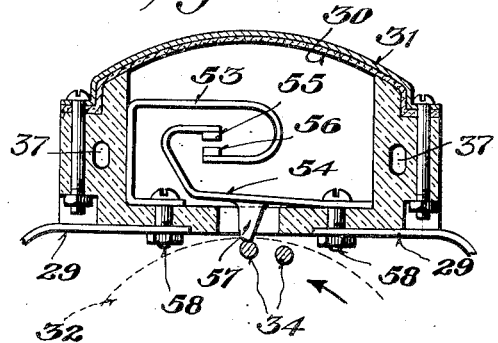
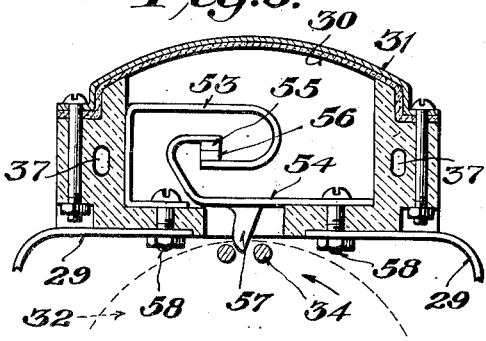
Inventor
Manious Garl,
By Lester L. Sargent
Attorney Aug. 7, 1934.    M. GARL    1,968,824
SIGNAL APPARATUS
Filed May 27, 1930    3 Sheets-Sheet 3

Inventor
*Manious Garl,*
By *Lester L. Sargent.*
Attorney

Patented Aug. 7, 1934

1,968,824

UNITED STATES PATENT OFFICE 1,968,824

SIGNAL APPARATUS

Manious Garl, Akron, Ohio; Linnie Garl executrix of said Manious Garl, deceased

Application May 27, 1930, Serial No. 456,083

3 Claims. (Cl. 200—152)

The object of my invention is to provide novel signal apparatus for use in transmitting fire alarm, police or other signals, and especially to provide a novel circuit-closing device; to provide novel circuit-breaking apparatus for transmitting signals; to provide the novel electric circuit or system for such an apparatus; to provide a novel switch device for such apparatus; and to provide the novel arrangement of mechanism hereinafter disclosed.

It is also an object of my invention to provide novel means for readily mounting in and easily removing such signal apparatus from the casing containing same, to facilitate oiling or repairing same or replacing it with new signal apparatus.

I attain these and other objects of my invention by the mechanism illustrated in the accompanying drawings, in which,—

Figure 1 is a front view of the mechanism with the cover in place;

Fig. 2 is a vertical section, with parts shown in side elevation;

Fig. 5 is a detail vertical section of the mechanism for breaking the circuit, the circuit being shown open;

Fig. 6 is a similar view with the switch in position to produce a closed circuit;

Fig. 7 is a detail vertical section of a modified form with the circuit open;

Fig. 8 is a detail vertical section of the same modified form with the circuit closed;

Fig. 10 is a top plan view of the mechanism for breaking the circuit, with the cover plate removed to show member 36.

Like characters of reference designate like parts in each of the several views.

Figure 3:
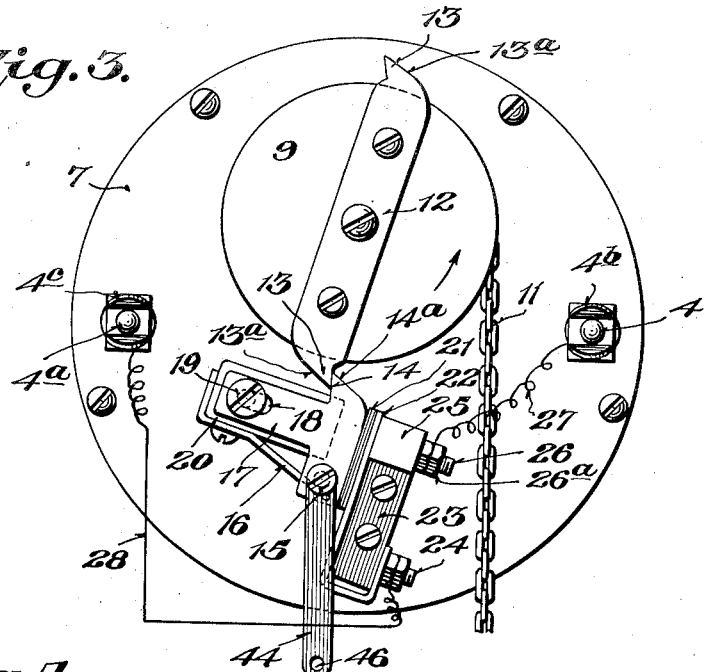
Fig. 3 is a rear view of the signal mechanism with the electric shunt closed.

Referring to the accompanying drawings, I provide a suitable casing 1 on which is mounted an insulation strip 2 made of bakelite or other suitable insulation material and carrying the hollow binding posts 3 and 3a which are connected with the respective line wires 5 and 5a. The insulation strip 2 is secured fast to the inside back of the main casing 1 and the line wires are connected to the binding posts 3 and 3a before the clock is placed in the casing. The clock casing is provided with contact springs 4b and 4c having their main portions spaced from the posts 4 and 4a and outside of same, whereby to make a plural contact with the hollow binding posts 3 and 3a carried by the insulation strip 2.

Figure 4:
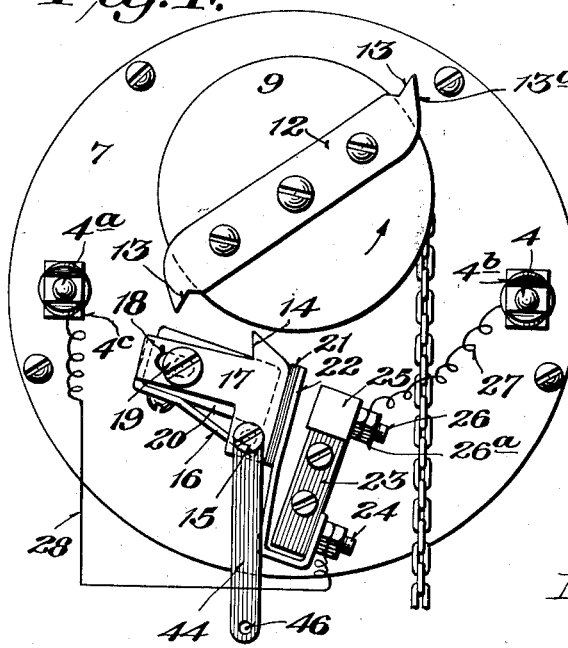
Fig. 4 is a similar view with the electric shunt open.

I provide a suitable and removable clock casing 7 in which is contained a conventional clock mechanism 12 actuated by a shaft 8 carrying the wind-up wheel or pulley 9 and driven by the spring 10. As shown in Figs. 3 and 4, I provide a pull chain 11 attached to the pulley 9, as shown in Fig. 2. I provide a knob 11a detachably secured to the pull chain 11, as shown in Fig. 1. Pulley 9 also carries a shunt or circuit-breaking member 12 having the reversely disposed ends 13 adapted to contact with the finger 14 of the lockout and shunt arm 17, which is pivotally and slidably mounted in its slotted portion 18 at its pivoted end and normally held in a raised position by a flat spring 16 which engages the pin 15 carried by the aforesaid arm 17. I provide a pin 19 projecting through the slot 18 of arm 17, said pin being mounted on block 20 which is affixed to the clock casing 7.

I provide an insulation strip 21 mounted on the flat shunt spring 22 which has its shank mounted on the insulation block 23 by means of the screw 24 which functions as a conducting element. The shunt or circuit closing spring 22 is normally out of contact with a contact member 25 on the end of block 23 but may be moved into engagement therewith to close the circuit. This contact member 25 is in electrical contact with the screw 26 and is connected by a wire 27 with one binding post 4 on the clock casing. The contact screw 24 is electrically connected by wire 28 to the other binding post 4a on the clock casing.

The clock casing 7 is provided with suitable binding posts 4 and 4a to removably seat in the corresponding hollow binding posts 3 and 3a carried by the insulation strip 2.

Referring to Figs. 1 and 2, on the opposite side of the clock casing I provide a rotatable disc or breaker wheel 32 removably mounted on a gear shaft 32a by means of a nut 32b, to permit of convenient removal of the breaker wheel to permit of changing at will the number and arrangement of the pins 34 and thus changing the call signals produced by the apparatus. The gear shaft 32a functions to operatively connect the breaker wheel with the clock mechanism. The breaker wheel 32 makes four revolutions while the wind-up wheel is making a half revolution from one finger 13 to the other finger 13. Disc or breaker wheel 32 is provided with an annular series of apertures 33 arranged in uniform spaced relation to the periphery of the wheel, and in which apertures any desired number of pins 34 are removably mounted. Pins 34 function to produce the desired operation of the pawl 35 and switch 36 to transmit the desired number of electrical impulses and thus produce the particular number of fire or police alarm signal to be transmitted from the call box.

I provide a pawl 35 made of suitable insulation material such as bakelite or the like, and positioned to actuate the pivoted make-and-break element or switch 36. Switch 36 is made of non-corrodible material such as Monel metal. I provide mercury cups 40 and 42 of suitable insulation material such as bakelite or porcelain, and suitable screws and nuts 29a of non-corrodible metal extending into the bottom of the mercury cups to function as electrical conductors, said members 29a being attached to the conductors 29 and forming a continuation of said conductors to the mercury in the respective mercury cups.

Pivoted switch 36 has a depending submerged end 38 which is continuously submerged in the mercury 39 in the mercury cup 40. The other end 41 of switch 36 is a knife end and is of suitable length to be plunged into and withdrawn from the mercury 42 in the mercury cup 43 to make and break the electrical circuit as each pin strikes the pawl 35, the pawl 35 in turn operating switch 36. End 41 is made sharp like a knife so that it will not splash when rapidly plunged into and withdrawn from the mercury. This is important for the reason that signal devices having a blunt ended switch will splash the mercury and do not operate properly as a result.

It will be noted that the pins 34 are mounted laterally or at right angles to the surface of the disc or breaker wheel 32 instead of tangentially, and that as a result a larger disc or breaker wheel can be used in a given size of signal apparatus, which in turn makes it possible to produce higher numbers by the use of a greater number of pins than would otherwise be practicable.

I provide slots 37 in the walls of the respective mercury cups, as shown in Figs. 5 and 6, to receive suitable fastening screws 37a, as shown in Fig. 1, to permit of vertical adjustment of the cups on the casing 7 whereby to regulate the depth of dip of the end 41 of the pivoted switch 36 in the mercury 42 of the mercury cup 43.

I provide a felt strip 30 over the mercury cups, this strip 30 being held in place by a metal covering strip 31 to which the felt is fastened. The metal strip 31 is secured to the insulation material of which the mercury cups are formed by suitable means such as the screws shown in Figs. 5 and 6. I provide straps 29 connecting binding posts 4 and 4a to the mercury cup, to which they are secured by members 29a, as shown in Figs. 5 and 6.

I also provide a trip strap 44 on the rear of the clock casing, said strap 44 being of insulation material and having an aperture 46 which permits of its being removably attached to the end of lever 48 carried by the rear face of the clock casing, as shown in Fig. 2. The trip strap 44 passes through a suitable opening 45 in the bottom of the main casing 1, and is releasably connected by a screw 47 with a pivoted lever 48 which is held in its normal position by a flat spring 49. The end of lever 48 rests on the upper side of the end of a second pivoted lever 50, which is provided with a knob 51 of insulation material. The finger 14 is pressed downward by finger 13 automatically when the person resetting the mechanism pulls the knob 11a downward as far as it goes. When finger 13 clears finger 14, spring 16 moves lever 17 upward, allowing finger 13 to engage with finger 14, in which position the mechanism is reset.

I provide the casing 1 with a glass face 6, which is held on the casing by a screw-threaded ring 52. I provide a felt ring 53 interposed between the glass face 6 and the annular edge of the main casing 1. The ring 52 has a screw threaded engagement as at 54 with the outer wall of casing 1 as shown in Fig. 2.

I also provide a second felt ring 55 between the rear portion of the clock casing 7 and the main casing 1.

When the make and break switch is not in use and the clock is not in operation, the shunt is closed as shown in Fig. 3, and the current entering through one line wire will travel through wire 27 to contact screw 26 and through contact member 25 and spring 22 to the contact screw 24, and thence through the wire 28 to the post 4a which is connected with the other line wire.

To operate the alarm signal, the user pulls downward on the knob 51 of the pivoted lever 50, which in turn operates the spring controlled pivoted lever 48 and thus actuates the strap 44 to operate the shunt-and-lock-out lever 17 to disengage its finger 14 from the finger 13 of the wind-up wheel 9, and allow said wheel to rotate. This movement of the wind-up wheel 9 allows the shunt to open and break the circuit through the wires 27 and 28. The current then passes through the line post and thence through one of the conductors 29, which is electrically connected with one of the mercury cups, the current thence passing through the pivoted switch element 36 and into the other mercury cup and thence through the conductor from the bottom of the mercury cup to the other line post.

Especial attention is called to the fact that the end 38 of the switch 36 is never withdrawn from the mercury 39 in the cup 40, but that the other end 41 of the switch 36 is alternately plunged into the mercury 42 of the cup 43 and withdrawn from same to make and break the electric circuit through the mercury cups. The switch 36 is actuated by the insulation pawl 35, the lower end of which pawl is disposed to contact with the laterally projecting pins 34 of the breaker wheel 32 as it rotates.

As many of these pins 34 are mounted in the breaker wheel 32 as are necessary to set up the desired number to be signalled from the particular call box.

After the alarm has been operated, to reset the mechanism the knob 11a and pull chain 11 are pulled downward, which causes one of the opposite fingers 13 to catch on the finger 14 of the shunt member 17. It will be noted that the rear portion of finger 14 is curved at 13a, as also the rear portion 14a of finger 14, to permit of these members moving past each other when the wind-up wheel 9 is rotated in a reverse direction from its normal movement by a downward pull of the pull chain 11.

When the knob is down a distance from the clock mechanism it shows that the clock mechanism is wound up. When it is released and not wound the knob is positioned close to the clock mechanism.

Figure 9:
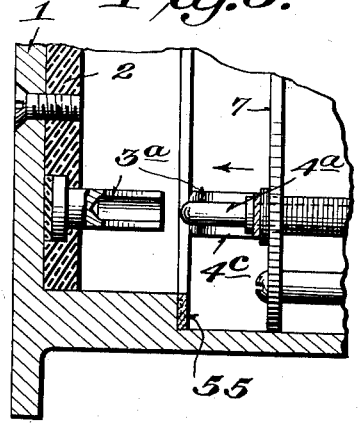
Fig. 9 is a detail sectional view of the back of the casing to show the means for removing the signal from the casing.

A novel feature of the invention is that the clock mechanism as a whole may be readily removed from the main casing 1 by simply pulling it out, the posts 4 and 4a having a merely slidable engagement with the hollow binding posts 3 and 3a which are rigidly affixed to the insulation strip 2 and pin 15 also permitting of the slidable disengaging of parts as described. Strip 2 is of bakelite or other suitable insulation material and is affixed to the main casing 1 as shown in the drawings, especially Fig. 9. This greatly facilitates the work of oiling, repairing, or replacing signal apparatus as occasion may require.

With reference to Figs. 5 and 6 of the drawings, the pivoted switch 36 has a bearing 36a which projects on either side of the switch to keep the switch ends aligned in the center of the mercury cups. This pivoted bearing is offset from the center of the switch so that the knife blade end 41 will normally drop back into the mercury cup and close the circuit, as shown in Fig. 6.

Referring to Figs. 7 and 8, there is illustrated a modification of the invention in which in place of the mercury cups, I provide reversely bent substantially U-shaped springs 53 and 54 carrying platinum contact points 55 and 56.

The spring 54 is provided with a depending projection or finger 57 adapted to contact with the pins 34 of the breaker wheel 32. In Fig. 7 the device is illustrated with the contact points 55 and 56 open and the circuit broken; and in Fig. 8 the device is illustrated with the contact points closed and the circuit completed.

I provide suitable screws and nuts 58 functioning as conductors to electrically connect the springs 53 and 54 with the conductors 29.

What I claim is:

1. In a device of the class described, spaced insulated mercury cups, a pivoted switch having one of its ends continuously plunged in one of the mercury cups and having the other end of suitable length so that it may be alternately plunged into and withdrawn from the other mercury cup as the switch is actuated to make and break an electrical circuit, a pawl in operative engagement with and adapted to operate the switch, means for actuating the pawl to break the circuit the same number of times as the number of the signal which it is desired to transmit, metal straps on which the mercury cups are mounted, electrical conducting members connecting said straps with the bottom of the mercury cups, the aforesaid mercury cups having vertically disposed slots, and fastening elements engaging in said slots to permit of convenient vertical adjustment of the mercury cups and associated mechanism.

2. In a device of the class described, a housing having spaced mercury cups provided in the floor thereof, the floor having an aperture, a pawl mounted in said apertured portion of the floor, a pivoted switch mounted above the pawl and operatively engaged therewith, said pivoted switch having one of its ends normally seated in one of the cups of mercury and having the opposite end normally out of but adapted to be submerged in the other cup of mercury.

3. In combination with the mechanism defined in claim 2, slots in the side walls of the aforesaid housing, and fastening screws fastening through said slots to permit of adjustment of the housing.

MANIOUS GARL.